July 23, 1957  J. P. GRIFFIN ET AL  2,800,565
GLASS ELECTRIC WATER HEATER

Filed Nov. 3, 1955  2 Sheets-Sheet 1

INVENTORS
John P. Griffin
Edward F. Griffin
BY
L. S. Saulsbury
ATTORNEY

July 23, 1957
J. P. GRIFFIN ET AL
2,800,565
GLASS ELECTRIC WATER HEATER
Filed Nov. 3, 1955
2 Sheets-Sheet 2
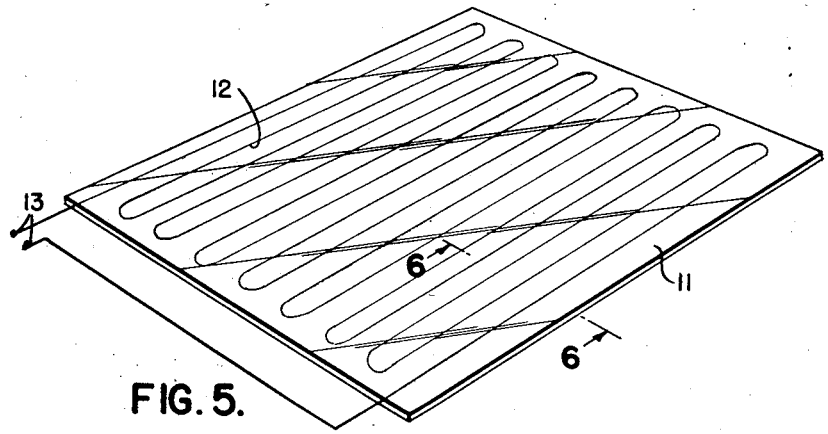
FIG. 5.
FIG. 6.
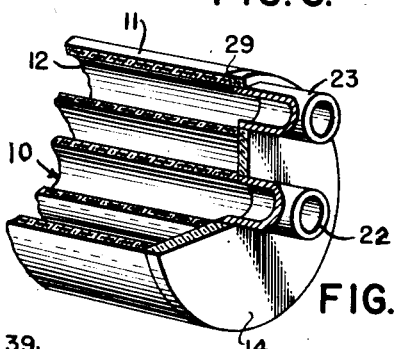
FIG. 7.
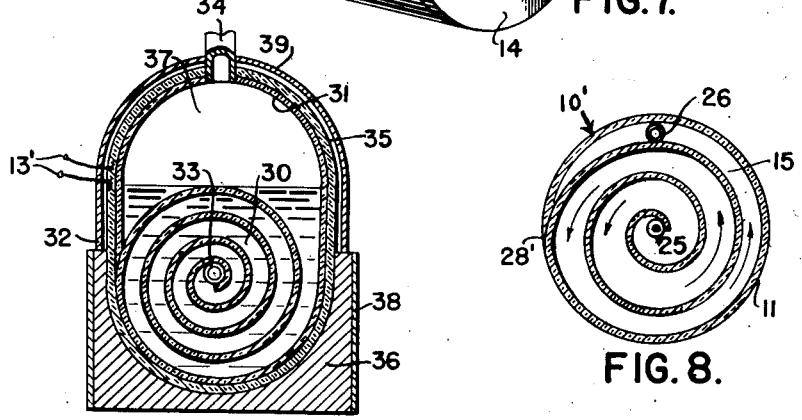
FIG. 9.
FIG. 8.
INVENTORS
John P. Griffin
Edward F. Griffin
BY
L. S. Saulsbury
ATTORNEY United States Patent Office 2,800,565
Patented July 23, 1957

2,800,565

GLASS ELECTRIC WATER HEATER

John P. Griffin, Palisades Park, and Edward F. Griffin, Paramus, N. J.

Application November 3, 1955, Serial No. 544,712

6 Claims. (Cl. 219—38)

This invention relates to a glass electric water and steam heater or boiler.

It is an object of the present invention to make an electric heater or boiler wholly from plate glass in which the heat is supplied to the heating liquid by an electric-supplied heating coil embedded in the glass body walls of the heater or boiler.

It is another object of the present invention to provide an electric heating unit or boiler that can be formed in a simple manner from sheet glass having electric heating coils embedded therein and the glass coiled or rolled spirally into the unit and the ends closed by end plates likewise formed of glass having inlet and outlet openings for the water passing through the heater and also openings for the electric control elements.

Other objects of the invention are to provide an electric heater or boiler which is simple in construction, inexpensive to manufacture, sold at low cost, adapted for mass production, has a minimum number of parts, easily and quickly assembled, light in weight, durable, glass sealed, eliminates fastening and assembly bolts, self-insulating from electric current, easy to cover with heat insulating material, easy to form into either water or steam boiler and efficient and effective in use.

Figure 1:
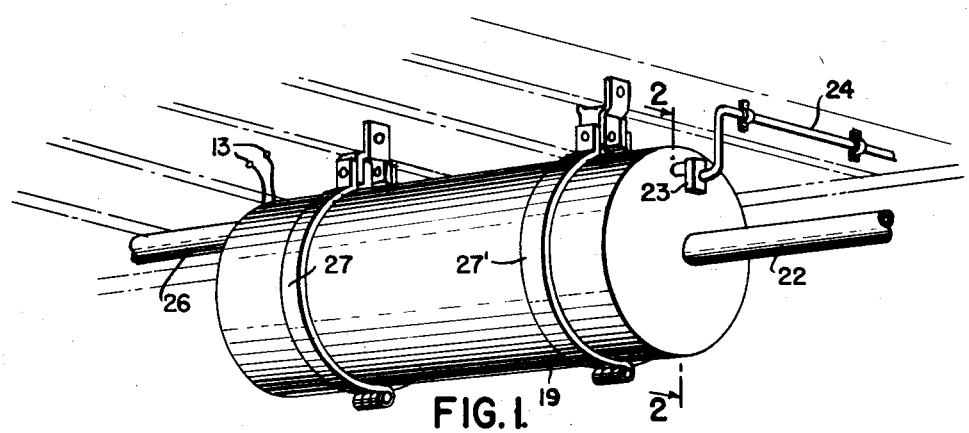
Figure 2:
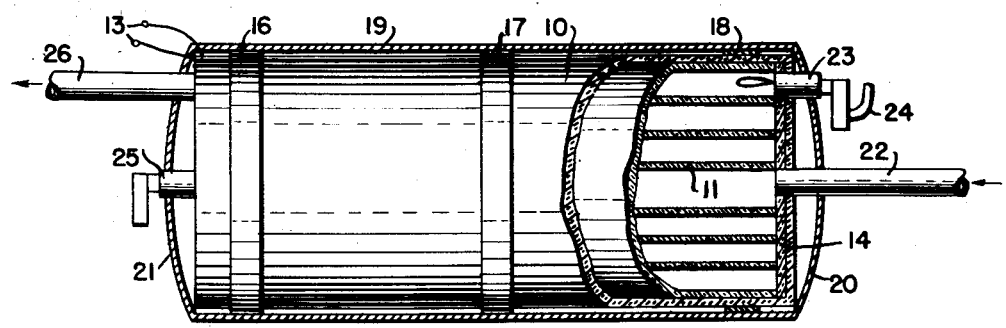
Figure 3:
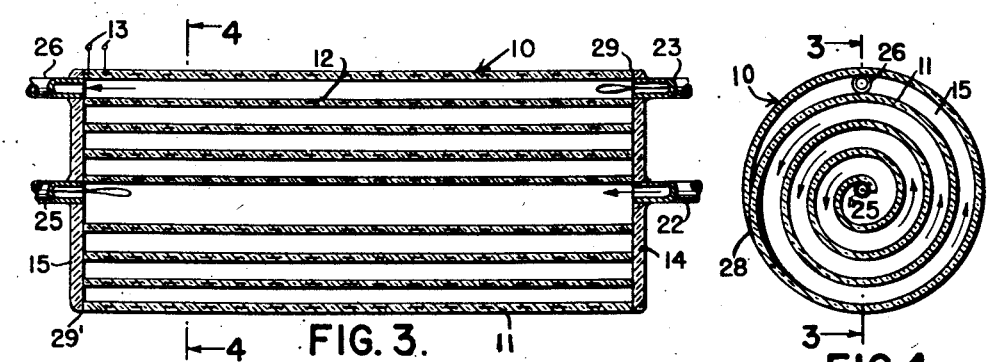
Figure 4:
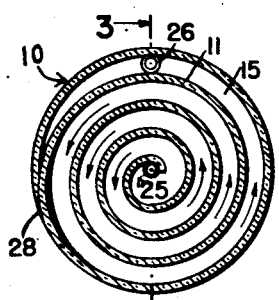

For other objects and for a better understanding of the invention, reference may be had to the following detailed description taken in connection with the accompanying drawing, in which Figure 1 is a perspective view of a water heater suspended from ceiling rafters, Fig. 2 is a fragmentary and longitudinal sectional view of the boiler shown in Fig. 1 and taken generally on line 2—2, as to the covering and insulation of the heater but with a portion of the boiler proper being broken away and in section to show the spiral construction thereof, Fig. 3 is a full longitudinal sectional view of the spiral wound glass heater proper separated from its insulating covering the view being taken generally on line 3—3 of Fig. 4, Fig. 4 is a transverse sectional view taken on line 4—4 of Fig. 3, Fig. 5 is a perspective view of the sheet glass blank with the heating wires embedded therein and from which the heater body is formed by rolling in the same into a helix, Fig. 6 is an enlarged fragmentary sectional view showing the glass plate thickness and the electric heating wires embedded thereon, the view being taken generally on line 6—6 of Fig. 5, Fig. 7 is a fragmentary perspective view of one end of the internal glass heater body with both the coiled plate and the one end boiler plate being broken away, Fig. 8 is a sectional view of a modified form of water boiler wherein the water passage through the boiler is of decreasing cross sectional area in the direction of the spiral flow of the water about the boiler body with the minimum cross section area being adjacent to the water outlet, and Fig. 9 is a vertical sectional view of a heating unit designed to serve as a steam boiler with the last turn of the glass plate enlarged and extended to provide a steam expansion chamber and a steam outlet pipe leading from the top thereof.

Referring now particularly to Figures 1 to 7, the water heater comprises generally a central body 10 formed of sheet glass from a blank plate 11, Fig. 5, having electric heating coil 12 embedded thereon and terminating externally of the plate with terminals 13 adapted to be connected to any electric supply, end plates 14 and 15 for closing the end of coiled plate, spaced bands 16, 17 and 18 and a shell cover 19 for enclosing the central body 10 and having end walls 20 and 21. Extending outwardly from the end plate 14 and through the end wall 20 is a water inlet pipe 22 and a thermostatic heat control unit 23 from which a cable 24 extends to a remote control unit that can be located in a room of a house being heated by the hot water heater. On the opposite end of the boiler and extending through the end plate 15 and the end portion 21 of the cover 19 are a water level control unit 25 and an outlet pipe 26 that leads to radiators or other heating units at a remote location from the boiler. This heater is round and so shaped that it can be suspended from ceiling rafters by means of large hinged clamp ring devices 27 and 27' laterally spaced from one another and surrounding the covering of the heater.

The water inlet pipe 22 enters the end plate 14 at the center thereof and at the center of the coiled plate 11 to start the cold water through its spiral course in the boiler body 10. Several turns of the plate are effected depending upon the size of the sheet plate and the water when passed from inlet will move in a spiral manner around through the boiler as indicated by the arrows shown in Fig. 4 until hot water is finally delivered through the location elevated from the inlet 22.

In the forming of this boiler body 10, the plate 11 shown in Fig. 5 having the heating resistance wire 12 therein is softened sufficiently to permit its easy rolling into a helix of the shape shown in Fig. 4 and the outer end is sufficiently heated so as to cause the fusion of the edge of the glass upon the surface of one of the last turns of the plate as indicated at 27 so as to make for a closed internal spiral compartment space of the boiler. The end plates 14 and 15 are attached to the end edges of the coiled plate and will be similarly fused into sealing relationship with the ends of the coiled plate 11 as indicated at 29 and 29' in Figs. 3 and 7. By these simple operations the heater body is made. The end plates may be formed of glass by a casting or pressing operation. The end plates may be provided with heating coils but are preferably formed of thick plain glass into which the pipe and control units may be fused or adhered. Once the central heating body 10 is formed it can be provided with the spaced band elements 16, 17 and 18 and the covering 19 extended thereabouts in any suitable manner.

In Fig. 8, there is shown a slightly modified construction in which the plate 11 is coiled in a slightly different manner in that the sectional area transverse to the direction of travel of the boiler is large at the beginning and gradually reduces in sectional area with the smaller sectional area being adjacent to outlet pipe 26 with the edge of the plate being fused at 28'. It will be understood the number of turns can be varied and also the cross sectional area of the water flow be varied depending upon the length of the plate 11 and upon its circumferential coiling length.

In Fig. 9 there is shown a horizontal steam boiler adapted for mounting on a floor surface. This boiler body is formed of an extra long glass plate and an embedded heating wire, the plate being wound or coiled on spiral path of flow for the water and with the lastmost turn of the plate being extended upwardly and providing a large steam chamber 31. The edge of the plate is fused to the lower portion 30 as indicated at 32. The lower portion has a water inlet 33 at the center thereof from which the cold water enters the boiler and the upper chamber portion 31 has a large top steam outlet pipe 34 from which steam flows to the point where it is to be used for heating purposes. The exterior of the glass plate boiler is coated with insulation 35 and the lower portion is mounted on a base 36 that may rest on a floor. The ends of the boiler body are closed by end plates, only one being shown as indicated at 37 and the end plate at the opposite end may bear the control units. The cables for the heating plate unit may enter the boiler at any location as indicated at 13'. The base 36 has a covering 38 and above the base there is a curved covering 39 passing over the upper portion 31 of the boiler.

It should now be apparent that there has been formed a heater, used either for hot water or steam, made of glass plate with embedded electric heating wire therein that can be formed by simply coiling a plate to provide a spiral water passage through the boiler in which the water will be heated and wherein the connections with the coiled plate body are effected through end plates closing the ends of the coiled body by a simple fusing operation.

It should be apparent that such a boiler can be made in large production and sold at low cost and that because of the nature of the boiler and the manner in which it is constructed heating loss can be kept to a minimum.

It will be understood that while the present description has been made relative to the manufacture of this heater in connection with glass that it may also be made from plastic material having similar characteristics as the glass and adapted to be rolled from a sheet into the desired helical shape and which will permit the insertion of the heating coil and be unaffected by the heat therefrom.

It should also be apparent that a hot water heater could be readily installed in one end of the boiler in the same manner as such heaters are installed in the usual present day type of furnaces and heaters. Such a hot water coil would be mounted on one of the end plates.

This heater may also be used for the purpose of heating water by itself where the water is to be used for purposes other than for heating radiators and to supply hot water to the household spigots.

While various changes may be made in the detailed construction, it shall be understood that such changes shall be within the spirit and scope of the present invention as defined by the appended claims.

What is claimed is:

1. A glass electric water heater comprising a coiled glass plate formed of a flat plate of glass coiled or rolled into a helix and having its end edge terminating upon the surface of the end turn of the plate and sealed thereto, an electric heating element disposed within the helix, end plates adapted to support control units for the furnace and inlet and outlet water connection pipes connected to the ends of the coiled plate in a water tight manner, the inlet pipe being connected to the center of the helix coil at one end and the outlet pipe being connected to the outer helix coil at the other end so that the water to be heated will travel helically in a radial and longitudinal path between the coils of the helix from the center of one end to the outer other end of the heater.

2. A glass electric water heater as defined in claim 1, and said terminal edge being fused to the glass surface to close off the end of the water chamber.

3. A glass electric water heater as defined in claim 2, and said end plates being fused about their periphery to the ends of the coiled plate.

4. A glass electric water heater as defined in claim 1, and the beginning of the internal inner turns of the coiled plate being of large cross-sectional area in the path of travel of water through the body and decreasing gradually in cross-sectional area toward the outer turn of the plate and toward the water outlet.

5. A glass electric water heating unit as defined in claim 1, and the lastmost turn of the plate being expanded to provide a large steam chamber portion, and a steam outlet pipe in the last turn of the coiled plate and communicating with the steam chamber.

6. A glass electric water heater as defined in claim 1, and said electric heating element being embedded in the coiled glass plate.

References Cited in the file of this patent

UNITED STATES PATENTS

| | | |
|---|---|---|
| 457,362 | Mitchell | Aug. 11, 1891 |
| 1,183,721 | Bowman | May 16, 1916 |
| 1,223,674 | Dearing | Apr. 24, 1917 |
| 1,476,116 | Thompson | Dec. 4, 1923 |
| 1,574,581 | Kay | Feb. 23, 1926 |
| 2,146,402 | Morgan | Feb. 7, 1939 |